United States Patent [19]

Clark et al.

[11] 4,169,373

[45] Oct. 2, 1979

[54] TIRE BEAD INSPECTION

[75] Inventors: Samuel K. Clark, Ann Arbor, Mich.; Manuel J. Lourenco, Alexandria, Va.

[73] Assignee: The United States of America as represented by the Department of Transportation, Washington, D.C.

[21] Appl. No.: 946,127

[22] Filed: Sep. 27, 1978

[51] Int. Cl.² .......................................... G01M 17/02
[52] U.S. Cl. ................................................... 73/146
[58] Field of Search ................ 73/146, 812, 849, 855; 254/50.3

[56] References Cited

U.S. PATENT DOCUMENTS

| | | | |
|---|---|---|---|
| 3,130,957 | 4/1964 | Branick | 254/50.3 |
| 3,157,387 | 11/1964 | Pinter et al. | 254/50.3 |
| 3,602,045 | 8/1971 | Pernau et al. | 73/812 |

Primary Examiner—Donald O. Woodiel
Attorney, Agent, or Firm—Herbert E. Farmer; Harold P. Deeley, Jr.; Otto M. Wildensteiner

[57] ABSTRACT

A tire bead inspection machine comprises a base on which a tire may be mounted for inspection. A frame is mounted on the base from which a first roller is cantilevered with a generally vertical axis and a pair of rollers on either side of the first roller are cantilevered in a direction transverse to the first roller, that is with generally horizontal axes. The frame is moveable on the base in a fashion to insert the first roller into the tire and force the bead outward, and at the same time swing the pair of rollers toward the vertical against their spring mountings in such a way that they exert force against the sidewall of the tire. In this fashion, the bead is grasped somewhat scissor fashion between the first roller and the pair of rollers. The first roller exerts a force against the inner part of the bead and the pair of rollers resist the force exerted by the first roller. By means of a lever arm holding the first roller, the displacement of the first roller with respect to the pair of rollers as the tire is rotated may be measured and converted into an electrical signal. If desired, a like arrangement may be used on both sides of the tire to inspect both beads at the same time.

13 Claims, 3 Drawing Figures

TIRE BEAD INSPECTION

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to tire inspection and particularly to the inspection of tire beads.

With the growing use of radial tires, it is believed that bead loads will generally be higher with radial tires than with conventional tires. Tire beads perform in a cyclic stress, or fatigue limited environment. The increased retreading of radial tires is apt to result in the use of tire beads over two or more life cycles under cyclic stress conditions somewhat greater than would be the case with the prior bias ply tires. Therefore, bead inspection techniques are of considerable prospective value to the retread industry and for the safety of users of retreaded tires.

2. Description of the Prior Art

For many years there have been only two practical bead inspection techniques available to the pneumatic tire industry. The first of these is hand and visual inspection, which has been developed to a relatively high degree of skill by trained tire inspectors. Nevertheless, in many cases, they are unable to find internal defects, particularly relatively small ones. Therefore, many tire companies have relied on a second inspection, that of X-ray or fluoroscopic examination of tires to determine the internal characteristics of tire beads. Prior suggestions for tire inspection machines included the use of infra-red detectors, holography, X-rays, ultrasonics, and vibrational resonance.

In addition, references may be made to various patents which disclose automatic tire inspection machines, which, however, do not involve bead inspection. These are U.S. Pat. No. 3,130,957 granted Apr. 28, 1964 to Branick; U.S. Pat. No. 3,540,697 granted Nov. 17, 1970 to Matteuzzi; U.S. Pat. No. 3,157,387 granted Nov. 17, 1964 to Pinter et al; U.S. Pat. No. 3,542,340 granted Nov. 24, 1970 to Peisl; U.S. Pat. No. 3,550,443 granted Dec. 29, 1970 to Sherkin; U.S. Pat. No. 3,602,045 granted Aug. 31, 1971 to Ternau; and U.S. Pat. No. 3,621,246 granted Nov. 16, 1971 to Horsey et al.

SUMMARY OF THE INVENTION

According to the invention, the stiffness of a tire bead is measured by exerting a generally axial force against one side of the tire bead at a first point and a resisting force at circumferentially adjacent points on the other side of the tire bead, and measuring the displacement at the first point as compared to the other two points. Preferably, a first roller is connected to a frame so that the roller may be positioned within a mounted tire and exert a force against the inner part of the bead. Simultaneously, a pair of rollers are applied as a resisting force to the outer side of the bead against the wall. The displacement of the roller may be measured by using a potentiometer fixed to the frame with a wiper arm connected by a lever arm to the first roller so that the wiper arm is moved in accordance with the displacement of the first roller against the positions of the other two rollers which essentially establish a fiducial plane. The tire may be rotated so that the entire bead may be examined and, if desired, a chart of the resultant voltage from the wiper arm recorded so that the tire may be examined automatically and mechanically for defects. Certain types of response, as described hereinafter, indicate a defect of the tire bead.

DETAILED DESCRIPTION OF PREFERRED EMBODIMENT

Figure 1:
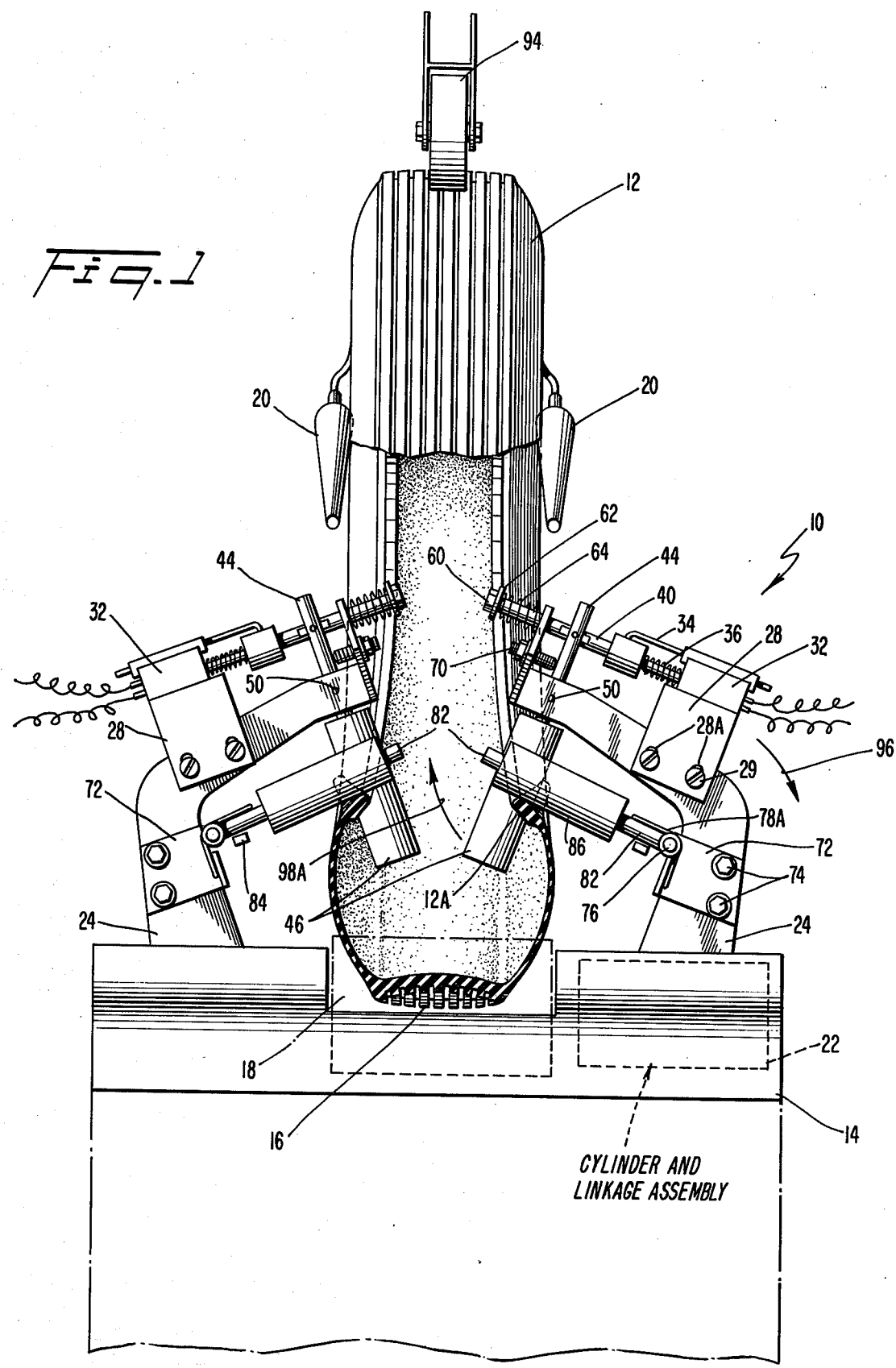
FIG. 1 is a front view of a tire inspection machine embodying the invention.

Referring to FIG. 1, a machine 10 for receiving a tire 12 for inspection is mounted on a base 14. The tire is mounted so that its crown 16 is in contact with a drum 18 so that the rotating drum may frictionally drive the tire for rotation. A pair of conical rollers 20 are also mounted either to the base or with stationary axes roughly 45° to the vertical near the upper portion of the tire to receive the tire between them in order to maintain the tire vertical, that is with its axis substantially horizontal and parallel to that of the drum 18.

A cylinder and linkage assembly 22 is also coupled to the base 14 to move a frame 24 in a fashion to be described hereinafter.

Figure 2:
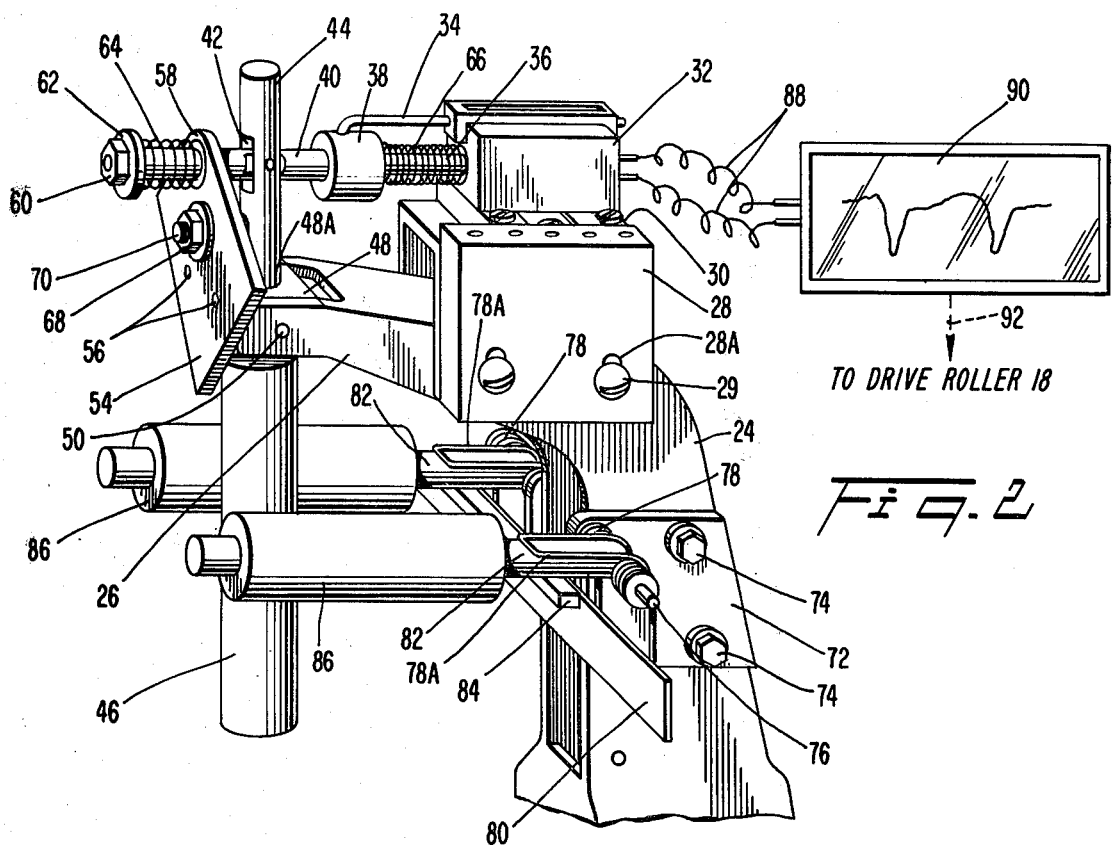
FIG. 2 is a partial perspective view of the tire inspection machine of FIG. 1.

Referring to FIG. 2, a pair of parallel arms 26, may be formed of a single piece of heavy metal bent or formed at its center to bring the arms to parallelism, are welded at their proximal ends, that is, where the single piece has been bent or formed, to the terminus of the frame 24. Accordingly, the arms extend outwardly from the end of the frame 24 to project into the interior or near the interior of a tire in place on the machine. A pair of plates 28 are provided each with a pair of slots 28A, each plate being bolted or screwed to one of the arms 26 as by screws 29 and also bolted to the extension of the frame 24 so that they aid in supporting the parallel arms 26 and stiffen the arms and their attachment to the frame. The slots 28A afford a degree of adjustment if required. Between the plates 28 extends a horizontal platform 30 on which is mounted a rectilinear potentiometer 32, the wiper arm of which is connected to an extension 34 and which also has a shaft 36 which is connected directly to the potentiometer housing and the axis of which is parallel with the axis of the wiper arm extension 34. A nut 38 is internally threaded on one side and screwed coaxially to the end of the shaft 36 which is externally threaded at its end remote from the housing of potentiometer 32 and on the other side, nut 38 is internally threaded and screwed to a larger diameter coupling shaft 40 having one end externally threaded to join the nut 34. The wiper arm extension 34 is also affixed at its end remote from the potentiometer 32 to the double threaded nut 38. The coupling shaft 40 passes through a slot or opening 42 at the upper end (as viewed in FIG. 2), of a lever arm or sensing shaft 44. At its other lower end, the sensing shaft 44 carries a sensing roller 46. The sensing shaft 44 between its upper and lower ends passes through a close fitting hole 48A in a retaining plate 48.

A pivot pin 40 which is held in the arms 26 passes through both the retaining plate 48 and through the vertical sensing shaft 44 normal to the axis where the shaft passes through the hole 48A, so that both the vertical retaining plate 48 and the vertical sensing shaft 44 pivot around the pin 50.

A guide and retaining plate 54 is affixed to the ends of the parallel arms 26 by screws 56 so that the plane of the guide and retaining plate 54 is substantially parallel to the axis of the vertical sensing shaft 44 and normal or perpendicular to the coaxial axes of the shaft 36 and the coupling shaft 40. A hole 58 in the guide and retaining plate 54 just comfortably receives the coupling shaft 40 which extends through it and thereby guides the shaft 40 and supports it for movement along its axis. At the distal end of shaft 40 remote from the double threaded nut 38 an end nut 60 retains a washer 62. A compression spring 64 is coiled around the coupling shaft 40 and held in compression between the end washer 62 and the guide plate 54. A compression spring 66 about the shaft 36 from the potentiometer 32 is retained in compression between the double threaded coupling nut 38 and the housing of the potentiometer 32.

An adjustment nut 68 is affixed to the guide plate 54 and into the nut 68 a machine screw 70 is inserted sufficiently far so that its end remote from the head of the screw bears against the sensing shaft 44 with the axis of the adjustment screw 70 substantially at right angles to the axis of the sensing shaft 44.

A pair of spring mounting plates 72 (only one of which is visible in FIG. 2) are mounted on either side of the frame or main arm 24 by means such as bolts 74. At right angles to and outwardly of the spring mounting plates 72 are carried a pair of rods 76 on which are mounted for rotation a pair of shafts 82 with axes substantially horizontal in FIG. 2 and held or spring loaded from their axes being turned toward the vertical about the rod by springs 78 suitably wound on the rod 76. One end of each spring 78 is held by a bar 80 having an axis substantially parallel to the axis of the rod 76 and carried underneath the rods by the spring mounting plates 72. The other and active looped mid-portions 78A of the springs 78 bear against the shafts 80 in small depressions provided for that purpose.

The axes of the pair of shafts 82 are held in substantial parallelism by a longitudinal member 84 fastened as by welding or any other suitable means to each of the shafts 82, the member 84 having its axis substantially parallel to the axes of the bar 80 and the rods 76. On the distal ends of the pair of shafts 82 are mounted a pair of rollers 86. The axes of the rollers 86 are, when not in use, substantially normal to the axis of sensing shaft 46 and the ends of the rollers 86 extend beyond the roller 46 from the frame or main arm 24 on either side of the sensing roller 46, as illustrated in FIG. 2. The sensing roller 46 and the side rollers 86 may be considered as cantilevered from their supports on their respective shafts.

The resistance of the potentiometer 32 may be placed across the terminals of a suitable direct current supply, (not illustrated) and the output taken electrically from between the wiper arm and ground. Assuming that one side of the power supply is grounded, the output may be taken from the wiper arm and, after suitable amplification if so desired, applied by two conductors 88 to a suitable chart recorder 90. If desired, the chart recorder may have the chart moved horizontally in synchronism with the rotation of the tire, or the chart may be driven in a horizontal direction at a rate comfortably to show one or more cycles of tire rotation in a suitable length of the chart being recorded, while, at the same time, the vertical motion of the pen is moved in a direction normal to that of the chart so that the pen traces along a Y axis, the position amplified of the wiper arm as controlled by the lever arm 44. A synchronizing mechanical or electrical connection, if one is supplied, of the nature described above is indicated by the line 92 which connect the drive of the drive roller 18 with the chart recorder 90.

The machine illustrated in FIGS. 1 and 2 is a modified form of a Branick tire inspection machine Model ATI. Such machines are well known and are used in the tire industry. The drum 18 and its housing and the base 14, together with the frame or main arm 24 and the roller 20 are parts of such a Branick machine. The rollers 46 and 86 and their mountings and the potentiometer 32 are supplementary portions as are the arms 26 which are added to the main arm 24 of the Branick machine. The Branick machine is designed to insert rollers which spread apart the bead of the tire and then bring up from beneath the machine an inverting roller which inverts the inside of the tire so the inside can be visually inspected for faults and defects. These rollers are removed when the rollers 46 and 86 are added. Those familiar with the Branick machine will understand the modification described herein.

In operation, the tire 12 is mounted for inspection on the machine in the usual manner to be driven by the drum 18 and held for rotation in a vertical plane by the side rollers 20 and further supported in place by the steadying roller 94 bearing against the tire from above. Looking now for the present only at the righthand portion of FIG. 1, and the tire, after the tire is mounted, the main arm 24 is moved axially of the tire to insert the sensing roller 46 within the periphery of the tire by actuating the cylinder and linkage assembly 22. The next movement of the arm 24 brings the sensing arm down and at the same time performs a rotational movement (clockwise for the righthand portion) as indicated by the arrow 96. As the main arm 24 rotates in the clockwise direction as indicated by the arrow 96, the sensing roller 46 being engaged in the bead of the tire, resists this motion and consequently pivots around the pivot pin 50 in a clockwise direction as indicated by the arrow 98A. The resultant motion brings the sensing roller 46 inside of the tire bead 12A and at the same time as the arm 24 is depressed, causes the side roller 86 to be raised and turned clockwise against the torsion of springs 78. The final position of the rollers is somewhat as shown in FIG. 1 in which the bead is caught somewhat as in a scissors action partially closed with the sensing roller 46 as one blade and the rollers 86 as another blade grasping between them the bead of the tire 12. After this position is reached the rollers 86 and 46 and the tire 12 are stationary. It will be apparent that the pair of rollers 86 provide a fiducial plane or a reference plane through their axes from which variations or motions of the contact point of the sensing roller 46 against the bead may be measured. The sensing roller 46 therefore responds to any stiffness or lack of stiffness of the tire bead as the tire is rotated around under the rollers and also responds to the absence of covering material or to bends or the like. In this position, it will be understood that the end of the adjustment screw 68 no longer bears against the sensing shaft 44 and that the sensing shaft 44 has been rotated somewhat about the pivot pin 50 and that the compression springs 64 and 66 are compressed, 64 against the guide plate 54, and the spring 66 against the housing of the potentiometer 32. The coupling shaft 40 has been constrained to move axially only, by virtue of the guiding action of the aperture 58 in the guide plate 54 and the location of the potentiometer shaft 36 and the potentiometer 32. The tire inversion feature of the machine for visual inspection may be retained, if desired. After inspection the machine may be actuated again, this time to return to its initial position by reversing the motions described above and releasing the tire.

Thus, by means of the sensing shaft 44 and roller 46 and the compression springs 64, 66, when the roller 46 is brought to bear against the inner part of the bead 12A, the sensing roller exerts a generally axially outwardly directed force against the bead. This force is balanced by the inwardly axially directed force exerted by means of the pair of resisting rollers 86 and the springs 78, which cause a force directed axially inward at a pair of points circumferentially spaced from the point where the sensing roller 46 bears against the bead 12A. As the tire rolls, it is flexed between the three rollers. The varying displacement of the sensing roller is transmitted by the sensing shaft 44 and the coupling shaft 40 to the potentiometer wiper arm and the displacement may then be displayed on the chart. The measure of the flexure (or conversely the stiffness) of the bead and the consequent display afford a measure of the bead integrity.

Figure 3:
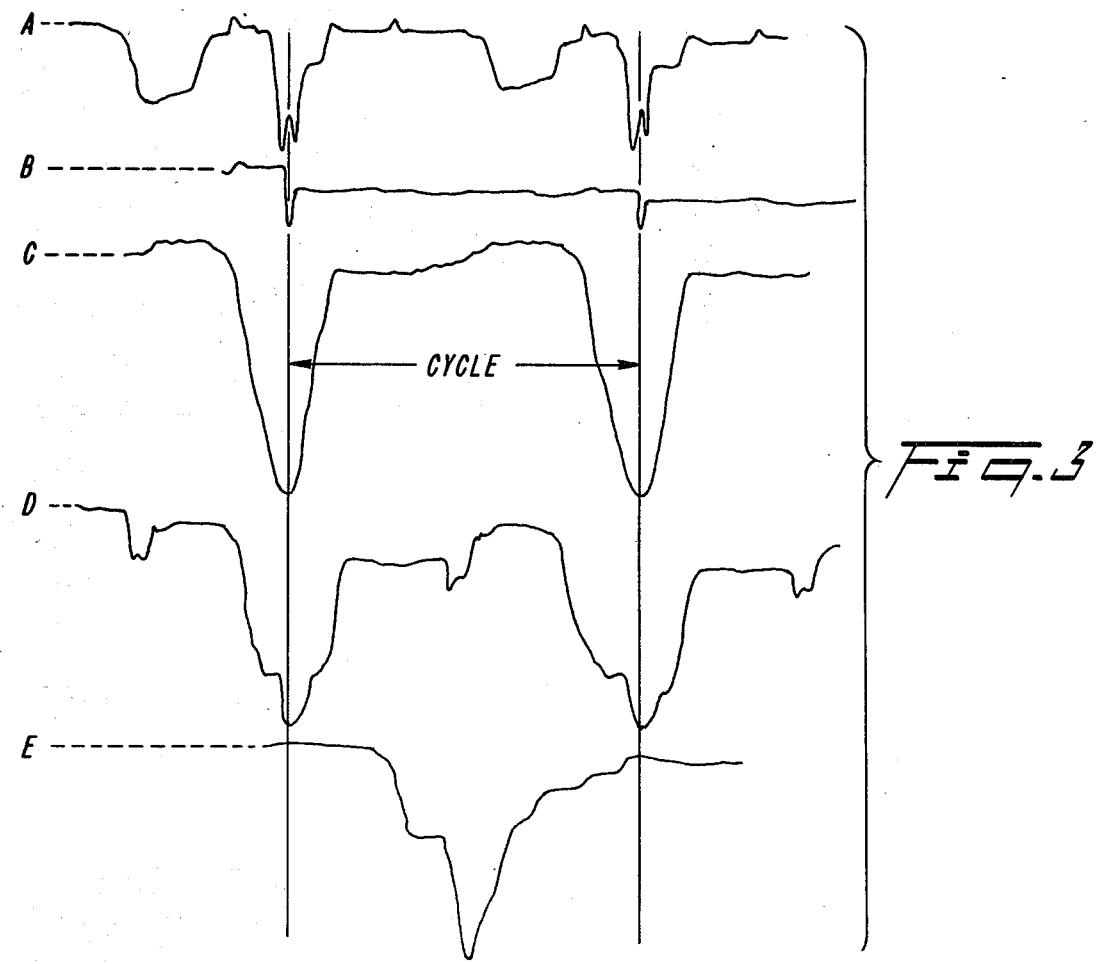
FIG. 3 shows graphs illustrating typical chart readings for damaged tires as a result of the use of the machine.

The beads of a tire comprise high tensile steel wires formed into inextensible loops and function to anchor the plies to hold the tire on the rim. In common parlance the portion of the tire around these wires and anchored to them are called the beads of the tire. The shape or contour of the bead conforms to the flange of the wheel and prevents the tire from rolling or slipping on the rim when under pressure. Heretofore, a common method of testing beads involved visual inspection and the operator also feeling the inner edge of the bead with his hands to determine that there were cuts or flaws which might indicate that the tire was unsuitable for recap. The inspection machine described herein will indicate bead anomalies such as kinks, cuts, chunks, bad bends or breaks. In such cases, the sensor roller 46 will cause an electrical signal from the potentiometer to show an abrupt change or deflection as the tire is rotated. This unusual change when compared with the signal from the rest of the bead can be observed and used to identify the presence of an anomaly. In fact, it appears that each bead exhibits its own individual, reproducible signature denoting the presence and nature of the flaw. The graph of FIG. 3A shows the response on a chart such as described in connection with FIG. 1 of two cuts in the bead of a tire. FIG. 3B shows the response as indicated in the chart of a chunk. The location of a bend in the bead of a tire produces a response such as illustrated in FIG. 3C. FIG. 3D shows the response for a kink. FIG. 3E shows the response for a broken bead. All of these responses resulted with the use of a sense roller 46 of about ½ inch diameter.

For further details and information, reference may be made to a government publication identified as Report No. DOT-TSC-NHTSA-78-37, being the final report under contract DOT-TSC-1031 of the Regents of the University of Michigan at Ann Arbor, Mich. 48109, the authors being F. K. Clark, R. N. Dodge, and R. B. Larson. The report is entitled "Inspection Techniques for Passenger Car Beads" and is expected to be available to the public in October, 1978, through the National Technical Information Service, Springfield, Va. 22151 and carries a description of the machine and certain prior art.

As a result of the testing of 1,000 tire beads, an inspection machine such as described herein was in direct agreement with visual inspection techniques approximately 90% of the time. About half of the disagreements involved beads which the machine rejected but the inspector approved, and one-half of these is centered around rejection or acceptance of bent beads, which is an area of controversy even inside the tire industry. The remaining 5% of disagreements were beads which the human inspector rejected but the machine indicated as approvable. Many of these discrepancies occurred in beads which have surface damage on the outside or flange portion of the bead. Fortunately, nevertheless, this outer side of the bead is easily seen and can be checked visually when the casing of the tire is checked for sidewall defects.

It is apparent that the portion of the machine illustrated in the right-hand portion of FIG. 1 and FIG. 2 may be duplicated on the other side of the tire inspection machine for inspection of the other bead as illustrated in the lefthand portion of FIG. 1. Accordingly, it is apparent that the inspection machine described herein provides an automatic bead inspection which can screen tires for such common bead defects as kinks, bends, cuts, chunks, and borken bead wires, and will accomplish the purpose readily, quickly and easily.

What is claimed is:
1. An arrangement for measuring the stiffness of a tire bead comprising:
   means for exerting a generally axial force against one side of the tire bead at a first point,
   means at a pair of circumferentially adjacent points on both sides circumferentially of said first point for resisting said force on the other bead side of the tire bead, and
   means for measuring the resultant axial displacement at said first point relative to the adjacent points to derive a measure of the bead stiffness.
2. An arrangement as claimed in claim 1, said one side of the tire bead being the inner side.
3. An arrangement as claimed in claim 2, said resisting means comprising means for applying a resisting force at said adjacent areas on the outer walls of said tire.
4. An arrangement as claimed in claim 2, said means for exerting an axial force comprising a roller having a surface applied at said inner side at said first point.
5. An arrangement as claimed in claim 4, said force resisting means comprising a pair of rollers having surfaces applied respectively at said adjacent points.
6. An arrangement as claimed in claim 1, said measuring means comprising an electrical measuring instrument for measuring said relative displacement.
7. A method of measuring the stiffness of a tire bead comprising the steps of:
   applying an axial force as a first point on one axial side of the bead,
   opposing said force on the other axial side of the bead at a pair of circumferentially adjacent points on both sides circumferentially of said first point, and
   measuring the axial displacement of said localized area relative to the adjacent areas,
   thereby to derive a measure of the bead stiffness.

8. A method as claimed in claim 7, further comprising the step of rolling said tire to apply said axial force to all the points of said bead.

9. A method as claimed in claim 7, further comprising simultaneously performing the same steps to the other bead of the tire.

10. An arrangement for measuring the stiffness of a tire bead comprising:
 a. a base;
 b. means for mounting a tire in place on said base;
 c. a frame on said base;
 d. a first roller;
 e. means for cantilever mounting said first roller on said frame, said frame being moveable from a first position to a second position with respect to said base and said mounting;
 f. means to move said roller by translating and turning said frame into a second position within the tire to engage the bead by said first roller from inside the tire mounted on said mounting means and exert outward force on the bead;
 g. a pair of rollers cantilevered and spring mounted to said frame with axis transverse to the axis of said first roller with said frame in said first position, said pair of rollers being swung against the force of said springs to exert an axial force on a tire in place against a side wall as said frame is moved to said second position to resist the outward force of said first roller on the bead, whereby the bead is flexed at a localized area; and
 h. means for measuring the resultant bead displacement by measuring the first roller displacement with respect to the pair of rollers from a fiducial position.

11. An arrangement as claimed in claim 10, said mounting means for said first roller comprising a lever means responsive to the first roller displacement against the tire bead.

12. An arrangement as claimed in claim 10, said measuring means comprising a potentiometer on said frame having a wiper arm mechanically connected to said lever, whereby the position of the wiper arm reflects the position of said first roller displacement.

13. An arrangement as claimed in claim 10, further comprising means to rotate said tire to roll different points of said bead against said first roller for measurement.

* * * * *